United States Patent Office 3,426,469
Patented Feb. 11, 1969

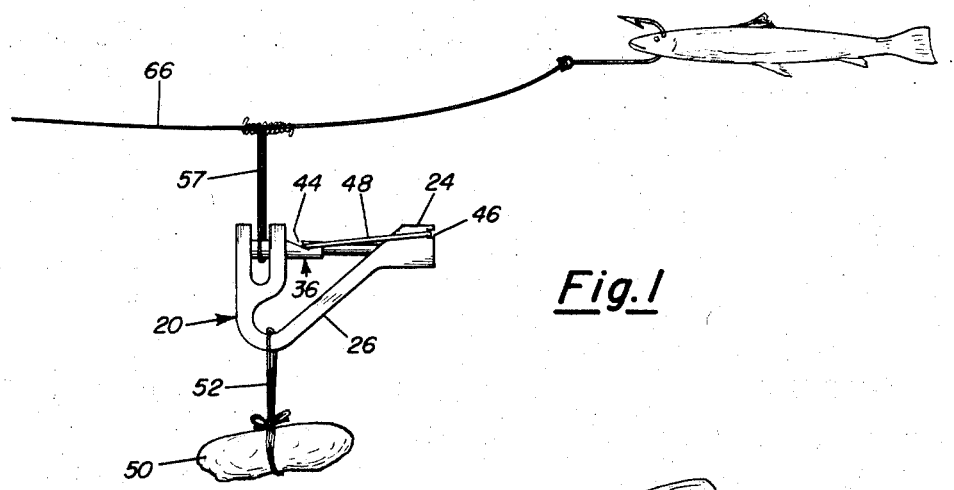
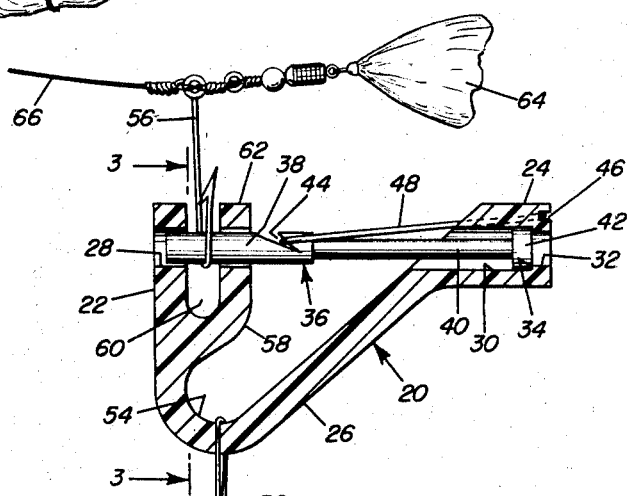
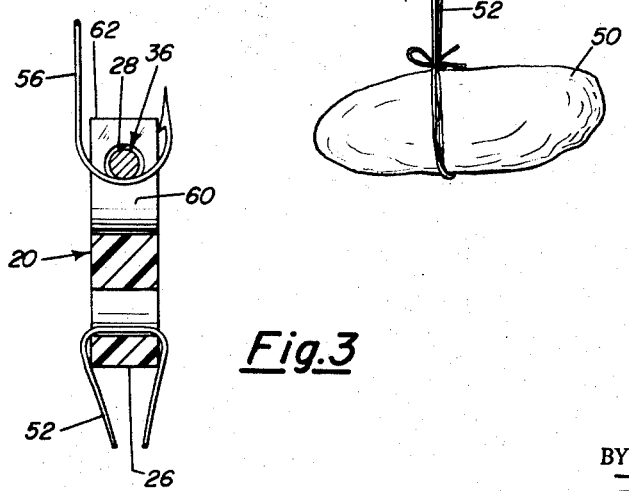
INVENTORS
OSCAR M. LEE
MONA F. LEE
ATTORNEYS

3,426,469
AUTOMATICALLY DETACHABLE
CASTING WEIGHT
Oscar M. Lee and Mona F. Lee, both of 5785 Derk Drive,
La Mesa, Calif. 92091
Filed July 25, 1966, Ser. No. 567,696
U.S. Cl. 43—43.12          7 Claims
Int. Cl. A01k 95/00

ABSTRACT OF THE DISCLOSURE

A weight carrier for casting a fishing line, which carrier has an abutment and a water soluble element yieldingly urged against the abutment by a pin. The carrier and the pin form a loop which receives a line carrying a weight. Upon dissolution of the water soluble element, the line for the weight is released whereby the weight is released.

The present invention relates to a weight carrier for casting a fishing line and more particularly to a weight carrier in which the weight is detached from the fishhook or lure almost immediately after the fishhook or lure falls into the water, whereby the fishhook or lure can rise to the surface or adjacent the surface of the water almost immediately after it falls into the water.

The weight carrier of the present invention includes a main body that is provided with an abutment for a water soluble element, such as a preformed saccharin tablet. It is also provided with an opening, leading from the abutment to the exterior of the body so that when dissolving, the saccharin can flow readily from the body. The carrier also includes a movable member, that is, movable to a position for engagement with the tablet when the tablet is in abutting relationship with the abutment, and, when it is in that position, it, in co-operation with the body, forms a loop. The member is movable to a second position, i.e., a non-loop forming position, upon dissolution of the tablet. The carrier also includes means which yieldingly urges the loop forming member against the tablet and the tablet against the abutment.

In one embodiment of the invention, the loop receives a fish line or a hook or a lure. In another embodiment, the loop receives a weight attaching element such as a line or string. In either embodiment, the loop is opened upon dissolution of the tablet.

In one embodiment of the invention, the weight carrier of the present invention includes a body which is bored to receive a pin, which pin and body form a loop for receiving a fishing line or the hook of a lure. The pin is yieldingly urged outwardly of the bore, by a resilient element, but is restrained from such movement by a water soluble tablet. Upon dissolution of the plug, the resilient element ejects the pin from the body whereby the line or hook is released from the body.

In this embodiment, the body as well as the pin, are expendable, i.e., both are released from the fishing line after the plug is dissolved.

In another embodiment of the invention, the body forms a part of the lure and is retrievable with the lure. In this embodiment, a second opening is provided in the body of the lure. This second opening is aligned with the movable member, which member impinges on the tablet. Access is had through this second opening for moving the movable member to a position whereby the tablet can be inserted in the body.

Other features and the advantages of the present invention will be apparent from the following description, reference being had to the accompanying drawings wherein preferred embodiments of the invention are illustrated.

In the drawings:

FIG. 1 is a side view of the weight carrier, approximately full scale, showing one embodiment of the invention;

FIG. 2 is a longitudinal, sectional view of the weight carrier shown in FIG. 1, but on a larger scale;

FIG. 3 is a sectional view taken along line 3—3 of FIG. 2;

Figure 4:
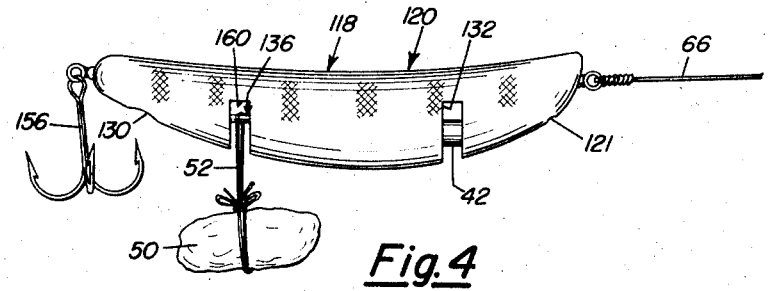
FIG. 4 is an elevational view of a lure embodying the present invention.
Figure 5:
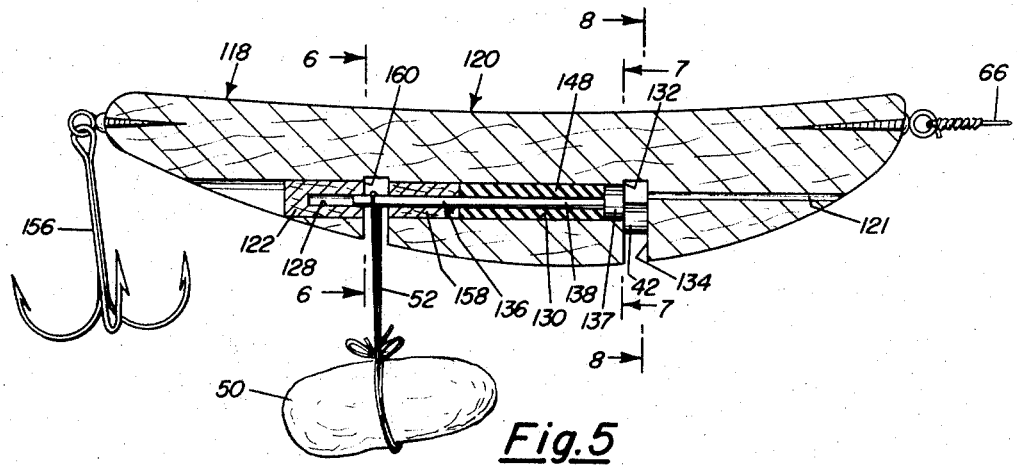
Figure 6:
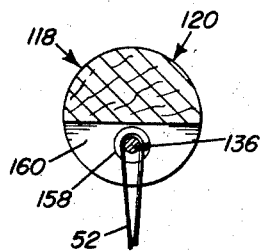
Figure 7:
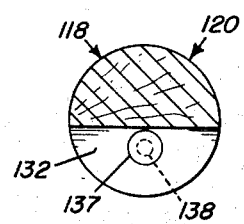
Figure 8:
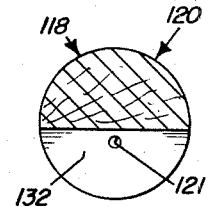

FIG. 5 is a longitudinal, sectional view of the lure shown in FIG. 4, but on a larger scale; and FIGS. 6, 7 and 8 are sectional views taken along the lines 6—6, 7—7 and 8—8, respectively, of FIG. 5.

Referring more in detail to the drawings, and particularly to the embodiment shown in FIGS. 1, 2 and 3, this embodiment shows the weight carrier of the expendable type. It includes a main body 20 having end sections 22 and 24 which are spaced from one another and connected by a connecting section or yoke 26. The end sections 22 and 24 are provided, respectively, with aligned bores 28 and 30. The bore 30 is provided with a smaller diameter portion 32 to form a circular shoulder or abutment 34. The body 20 may be formed of inexpensive plastic that can be molded. The bored portion 32 extends through the section 24.

The bores 28 and 30 receive a pin 36, having a large diameter portion 38 and a smaller diameter portion 40. The larger diameter portion is guided by the bore 28 in the section 22 and the smaller diameter portion 40 extends into the bore 30. As viewed in FIG. 2, the right end of the pin portion 40 is in abutting relationship with a tablet 42 of water soluble material such as saccharin, like manufactured by Norwich Pharmacal Co., whose address is Norwich, N.Y., and which is sold under the name of "Norwich Saccharin." The tablet 42 is of smaller diameter than the bore 30 but it is of larger diameter than the portion 32 and abutment 34.

The larger diameter portion 38 of the pin 36 is provided with a notch 44 and the right end of the section 24 of the body 20 is provided with a notch 46. A rubber band 48 is disposed in the notches 44 and 46 and is under tension and provides means for yieldingly urging the pin 40 against the tablet 42.

A weight 50 is suitably fastened to the body 20 and is herein shown as fastened to the body 20 by a fish line or a string 52, which is looped about the section 26 of the body 20, the sections 22, 26 and 24, of the body 20, forming a loop 54 for receiving the string 52.

A fishing line or fishing hook, herein shown as a fishing hook 56 in FIGS. 2 and 3 and as a line 57 in FIG. 1. is hooked about the pin 36. Preferably, the hook 56 or line 57 is isolated from the loop 54 so as to prevent entanglement with the string 52 and therefore, a projection 58 is disposed between the end section 22 and the end section 24 so as to provide a separate compartment 60 for the hook or line. If desirable, this projection can be extended as shown at 62, in which event, it would be a continuation of the bore 28 and would assist in guiding the pin 36.

In operating the device, a tablet 42 is placed in the position shown in FIG. 2; then the pin 36 is placed into position and thereafter, the rubber band is hooked over the notches 44 and 46 and consequently it is under tension. Before or after the pin and tablet are so assembled, the weight 50 can be attached in any suitable manner. Thereafter, the fish line or the fish hook, which latter is part of the fish lure such as a fly, the feathers thereof being shown at 64, is hooked about the pin as shown. Thereafter, the body 20 with the weight and the lure attached thereto, is cast by the fishing line 66. The tablet 42, immediately after it falls in the water, starts to dissolve and within a few seconds the dissolution is such as to cause the rubber band 48 to move to the right to thereby release the hook 56 or line 57. This dissolving is augmented due to the pressure being applied by the pin on the tablet 42 through the rubber band 48. Upon movement of the pin to the right, the hook or line is released. Due to the weight being applied for casting, the lure can be cast much farther, and due to the fact that the tablet dissolves substantially immediately, the fly type lure is brought to the surface within seconds after it strikes the water.

Referring now to the embodiment shown in FIGS. 4 to 7, inclusive, there the main body is shown at 120 in the form of a floating lure 118. This body includes sections 122 and 158, which are disposed in a bore 130. The sections 122 and 158 are inserted into the bore 130 as a dowel pin, which before insertion into the bore 130, was drilled to form the bore 128 for a pin 136. After the dowel pin is inserted in position, it and the main body 120 are grooved, the groove being indicated at 160. Preferably the dowel pin is held in position by a glue or an epoxy.

A second groove is also formed in the body 120 to form the opening 132 and an abutment 134. This opening receives the water soluble tablet 42. The tablet is held in position against the abutment 134 by the head 137 of the pin 136. The shank 138 of this pin is guided by the bore 128 in the sections 122 and 158. The means for yieldingly urging the pin 136 to the right, as viewed in FIG. 5, comprises a rubber grommet 148 which surrounds the shank 138 of the pin 136 and is compressed between the right end of section 158 and the left side of the head 137 of the pin 136.

The auxiliary weight in the form of, for example a stone 50, is connected with a string 52 which extends into the groove or opening 160 and is looped about the shank 138 of the pin 136. Upon partial dissolution of the tablet 42, the rubber grommet 148 will move the pin to the right and away from the loop of the string 52, whereby the weight falls away from the lure 118. Thus, it will be seen that substantially immediately after the lure strikes the water, dissolution takes place and substantially immediately the weight 50 is released from the lure.

The front or right end of the lure 118 is provided with a pin hole 121 which extends from the front end of the lure to the opening 132 and is in alignment with the groove 130. By inserting a small rod through the pin hole 121, and upon engagement of the rod with the head 137 of the pin 136, the pin 136 can be moved to the left so as to clear the opening 132. Thereafter, upon inverting the lure, a tablet 42 can be placed in position, and then upon withdrawal of the rod, the tablet will be held against the abutment 134 by the head 137 of the pin.

The lure 118 is provided with the usual gang hook 156, at the rear thereof and the fishing line 66 is suitably attached to the front end of the lure.

From the foregoing, it is readily apparent that a weight carrier has been provided for materially lengthening the distance of casting a light weight lure, such as a live minnow, an anchovy, a fly, or a floating lure. Such weight carrier is relatively inexpensive, since it can be molded and is formed so that a costless element, such as a stone can be attached thereto. While a water soluble element is used, such element is not placed under strain by the application of the weight (stone) which is attached to the weight carrier. All strain is placed upon the pin 36 or pin 136.

Also, it is readily apparent from the foregoing that such weight carrier forms a part of an artificial lure and is retrievable with the lure.

We claim:
1. A weight carrier for casting a fishing line, comprising in combination:
 (A) a main body having:
  (1) spaced end sections, said sections having aligned bores, an abutment disposed in alignment with said bores, a water-soluble element positioned against said abutment;
  (2) a section connecting the end sections;
 (B) a pin in the bores movable to a position of engagement with the water-soluble element when said element is in abutting relationship with said abutment and when in said position said pin cooperates with the body to form a loop, said pin being movable to a non-loop forming position upon dissolving of said element;
 (C) and means yieldingly urging said pin against said element and the element against said abutment.

2. A weight carrier for casting a fishing line, as defined in claim 1, characterized in that it is part of a lure.

3. A weight carrier for a fishing lure as defined in claim 1, characterized in that the means for yieldingly urging an end of the pin against the water-soluble element comprises a rubber band.

4. A weight carrier as defined in claim 1, characterized in that the means for yieldingly urging the pin comprises a grommet.

5. A weight carrier for casting a fishing line as defined in claim 2, characterized in that the main body is provided with:
 (A)(3) an opening aligned with the pin through which access is had for moving said pin away from the first mentioned position thereof.

6. A weight carrier as defined in claim 1, characterized in that the body includes:
 an integral projection on one section extending toward the other section to form, with the one section, the connecting section and the pin, a second loop.

7. A weight carrier as defined in claim 6, characterized in that the projection is interposed between the end sections and has a bore therethrough in alignment with the bores in the end sections.

References Cited

UNITED STATES PATENTS

| | | | |
|---|---|---|---|
| 2,171,372 | 8/1939 | Peck | 43—42.06 |
| 2,799,115 | 7/1957 | Reus | 43—43.12 |
| 2,803,915 | 8/1957 | Zwiercan | 43—42.06 |
| 2,844,906 | 7/1958 | Phillips | 43—43.12 |
| 2,994,622 | 8/1961 | Miller | 43—43.12 X |

SAMUEL KOREN, *Primary Examiner.*

D. J. LEACH, *Assistant Examiner.*